(12) United States Patent
Ravichandran

(10) Patent No.: US 11,354,684 B2
(45) Date of Patent: Jun. 7, 2022

(54) DATA ANALYTICS FOR INTERNATIONAL PRODUCT QUALITY AND USER EXPERIENCE

(71) Applicant: Citrix Systems, Inc., Fort Lauderdale, FL (US)

(72) Inventor: Karthikeyan Ravichandran, Bengaluru (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 456 days.

(21) Appl. No.: 15/889,923

(22) Filed: Feb. 6, 2018

(65) Prior Publication Data

US 2019/0244225 A1 Aug. 8, 2019

(51) Int. Cl.

| | |
|---|---|
| *G06Q 30/02* | (2012.01) |
| *G06N 3/04* | (2006.01) |
| *G06N 3/08* | (2006.01) |
| *G10L 15/00* | (2013.01) |
| *G10L 15/22* | (2006.01) |
| *G10L 15/18* | (2013.01) |
| *G06F 3/0484* | (2022.01) |
| *G06F 40/30* | (2020.01) |
| *G06F 40/58* | (2020.01) |

(Continued)

(52) U.S. Cl.
CPC ....... *G06Q 30/0201* (2013.01); *G06F 3/0484* (2013.01); *G06F 40/30* (2020.01); *G06F 40/58* (2020.01); *G06N 3/04* (2013.01); *G06N 3/08* (2013.01); *G06Q 30/0282* (2013.01); *G10L 15/005* (2013.01); *G10L 15/1815* (2013.01); *G10L 15/22* (2013.01); *G06Q 50/01* (2013.01); *G10L 15/26* (2013.01)

(58) Field of Classification Search
CPC ........... G06Q 30/0201; G06Q 30/0282; G06Q 50/01; G06F 40/58; G06F 40/30; G06F 3/0484; G06N 3/04; G06N 3/08; G10L 15/005; G10L 15/1815; G10L 15/22; G10L 15/26
USPC ........................................................ 705/7.29
See application file for complete search history.

(56) References Cited

U.S. PATENT DOCUMENTS

| | | | | |
|---|---|---|---|---|
| 2014/0114648 | A1* | 4/2014 | Eggink | G06F 40/30 704/9 |
| 2015/0378714 | A1* | 12/2015 | Katariya | G06F 8/65 717/170 |
| 2017/0372231 | A1* | 12/2017 | Ghatage | G06F 40/58 |

OTHER PUBLICATIONS

Khalid, et al., Examining the Relationship between FindBugs Warnings and App Ratings, 33 IEEE Software 4 (2016) (Year: 2016).*

* cited by examiner

*Primary Examiner* — Charles Guiliano

(74) *Attorney, Agent, or Firm* — Foley & Lardner LLP

(57) ABSTRACT

Data analytics techniques can improve international software product quality and user experience. The system uses data mining to identify and assess region-specific issues in a software product. The system uses predetermined keywords, patterns and neural networks to mine customer feedback from heterogeneous data sources in order to accurately and efficiently identify and assess technical problems in a software product. The system, upon mining the data sources to determine the usage patterns and expectations that led to the identified technical problems, can facilitate the development of a software update or patch for the software product that can solve or mitigate the identified technical problem, resulting in the software product having improved globalization maturity and international user experience.

18 Claims, 8 Drawing Sheets

(51) Int. Cl.
*G06Q 50/00* (2012.01)
*G10L 15/26* (2006.01)

Electronic Dashboard
420

DATA ANALYTICS FOR INTERNATIONAL PRODUCT QUALITY AND USER EXPERIENCE

BACKGROUND OF THE DISCLOSURE

Software products, applications or tools can be used in different geographic regions, in different settings, and in different ways. Using or executing a software product in different geographic regions can expand the reach of the software product across multiple regions. However, technical issues or problems may arise when software products are used or executed in multiple regions or localized language environments. Due to the large number of different geographic regions and settings in which a software product or tool can be executed or used, it may be challenging to efficiently and accurately assess technical problems or issues that arise in the specific geographic regions or settings.

BRIEF SUMMARY OF THE DISCLOSURE

The present solution provides a data processing system configured with data analytics techniques that can be used to improve international software product quality and user experience. The data processing system can use data mining techniques to identify and assess region-specific issues in a software product. For example, the data processing system can use predetermined keywords, patterns and neural networks to mine customer feedback from heterogeneous data sources in order to accurately and efficiently identify and assess technical problems in a software product. The data processing system, upon mining the data sources to determine the usage patterns and expectations that led to the identified technical problems, can facilitate the development of a software update or patch for the software product that can solve or mitigate the identified technical problem, resulting in the software product having improved globalization maturity and international user experience.

The level of satisfaction a customer has with a software product can vary based on the customer's usage patterns and expectations with the software product. These usage patterns and expectations can vary from customer to customer due to the different geographic regions or settings in which the software product may be executed or used, as well as the different languages, characteristics or attributes associated with the usage of the software product. For example, usage patterns or expectations of a software product might different for international, non-English speaking users, or use of a software product in a different country such as Japan or Germany where English is not the primary spoken language, as compared to English speaking users that are using the software product in a country where English is the primary spoken language, such as the United States or England. Due to various usage patterns and expectations, it can be challenging to accurately or efficiently determine the difficulties faced by an international customer. Further, due to the various heterogeneous feedback data sources and large volume of feedback, it can be challenging to efficiently analyze the feedback from English language customers and customers using the software product in international markets where the English language is not widely spoken to identify the technical problems faced by the international user. Thus, the data analytics techniques and tools utilized by the data processing system of the present solution can mine heterogeneous feedback data sources to showcase the keywords associated with usage patterns or difficulties of the international users. By showcasing these keywords, the data processing system can facilitate the development of a technical solution for the software product.

At least one aspect of the disclosure is directed to a method of identifying issues in products. The method includes a data processing system obtaining data from multiple heterogeneous sources. The data can provide feedback in different languages on one or more products. The method includes the data processing system storing the feedback in a repository. The method includes the data processing system identifying multiple keywords and multiple patterns to use for mining the feedback stored in the repository. The method includes the data processing system mining the feedback stored in the repository using a neural network and the keywords and the patterns. The method includes the data processing system enumerating the feedback stored in the repository into categories. The data processing system can enumerate the feedback into the categories responsive to mining the feedback using the keywords and patterns. One or more of the categories can identify issues by the different languages. The method includes the data processing system generating graphical output that includes an electronic dashboard. The electronic dashboard can include an enumeration of the feedback in the one or more categories that identify issues by the different languages. The method includes the data processing system transmitting, via a network, the graphical output to a client device. Receipt of the graphical output by the client device can cause the client device to render the graphical output for display via a display device.

In some embodiments, the data processing system can obtain the data via at least one of a customer escalation database, electronic mail, an online social network platform, or an online application delivery marketplace. In some embodiments, at least a portion of the data is generated from voice input provided by customers. The method can include the data processing system determining, from the data, the different languages of the voice input. The data processing system can establish, responsive to determining the different languages of the voice input, the one or more categories that identify issues by the different languages.

In some embodiments, the one or more categories correspond to at least one of a type of issue or a severity of the type of issue. In some embodiments, the patterns can include at least one of Unicode, translation, truncation, double-byte character set, non-English, locale, or input method editor.

In some embodiments, the data processing system can generate the electronic dashboard with an indication of one or more languages that are error prone for the one or more products. In some embodiments, the data processing system can generate the electronic dashboard with an indication of one or more areas that are error prone. The one or more areas can include at least one of keyboard, Unicode, or right-to-left.

In some embodiments, the data processing system can enumerate, using semantic analysis, the feedback into a negative sentiment category, a neutral sentiment category, and a positive sentiment category. The data processing system can generate the graphical output with the electronic dashboard including the enumeration of the feedback into the negative sentiment category, the neutral sentiment category, and the positive sentiment category. In some embodiments, the electronic dashboard can include an interactive electronic dashboard. The data processing system can receive a selection of the negative sentiment category. The data processing system can generate updated graphical output that includes the interactive electronic dashboard with an indication of one or more languages associated with the negative sentiment category.

In some embodiments, where the electronic dashboard includes an interactive electronic dashboard, the data processing system can receive a selection of the negative sentiment category. The data processing system can generate updated graphical output that includes the interactive electronic dashboard with an indication of one or more patterns associated with the negative sentiment category.

At least one aspect of the disclosure is directed to a system for identifying issues in products. The system can include a data processing system. The data processing system can include one or more processors and memory. The data processing system can include an interface, a data miner, and a dashboard builder. The interface obtains data from heterogeneous sources. The data provides feedback in different languages on one or more products. The interface stores the feedback in a repository. The data miner identifies keywords and patterns to use for mining the feedback stored in the repository. The data miner mines the feedback stored in the repository using a neural network and the keywords and the patterns. The data miner enumerates the feedback stored in the repository into categories. The data miner can enumerate the feedback responsive to mining the feedback stored in the repository. One or more of the categories can identify issues by the different languages. The dashboard builder can generate graphical output that includes an electronic dashboard. The electronic dashboard can include an enumeration of the feedback in the one or more categories that identify issues by the different languages. The dashboard builder can transmit, via a network, the graphical output to a client device. Receipt of the graphical output by the client device can cause the client device to render the graphical output for display via a display device.

In some embodiments, the data processing system is further configured obtain the data via at least one of a customer escalation database, electronic mail, an online social network platform, or an online application delivery marketplace.

In some embodiments, at least a portion of the data is generated from voice input provided by a plurality of customers. The data processing system is further configured to determine, from the data, the different languages of the voice input. The data processing system can establish, responsive to the determination of the different languages of the voice input, the one or more categories that identify issues by the different languages.

In some embodiments, the one or more categories correspond to at least one of a type of issue or a severity of the type of issue. In some embodiments, the patterns can include at least at one of Unicode, translation, truncation, double-byte character set, non-English, locale, or input method editor.

In some embodiments, the data processing system is further configured to generate the electronic dashboard with an indication of one or more languages that are error prone for the one or more products. In some embodiments, the data processing system is further configured to generate the electronic dashboard with an indication of one or more areas that are error prone, the one or more areas comprising at least one of keyboard, Unicode, or right-to-left.

In some embodiments, the data processing system is further configured to enumerate, using semantic analysis, the feedback into a negative sentiment category, a neutral sentiment category, and a positive sentiment category. The data processing system can generate the graphical output with the electronic dashboard including the enumeration of the feedback into the negative sentiment category, the neutral sentiment category, and the positive sentiment category In some embodiments, the electronic dashboard includes an interactive electronic dashboard. The data processing system can receive a selection of the negative sentiment category. The data processing system can generate updated graphical output that includes the interactive electronic dashboard with an indication of one or more languages associated with the negative sentiment category.

In some embodiments in which the electronic dashboard includes an interactive electronic dashboard, the data processing system can receive a selection of the negative sentiment category. The data processing system can generate updated graphical output that includes the interactive electronic dashboard with an indication of patterns associated with the negative sentiment category.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
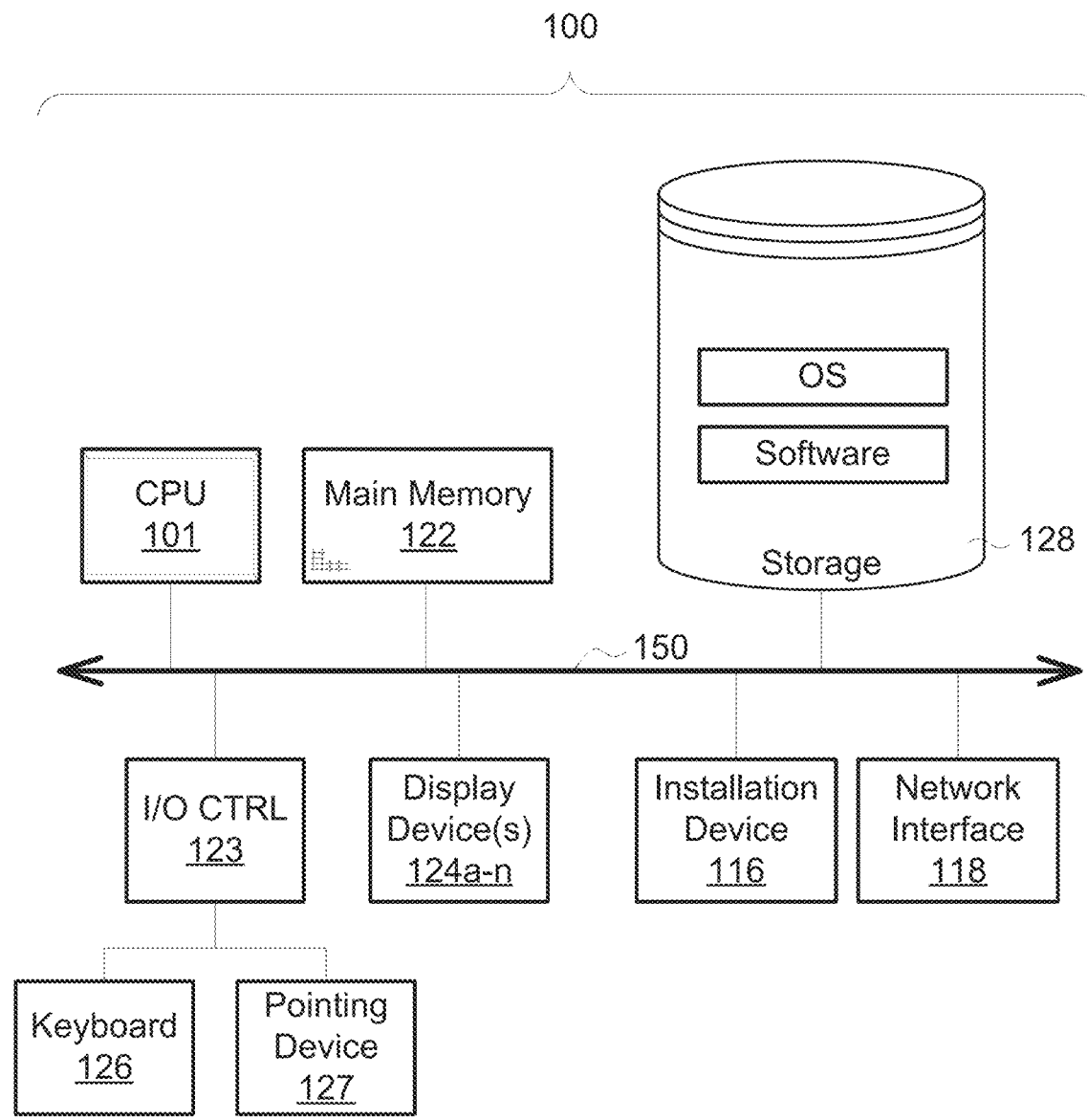
FIGS. 1A-1D are block diagrams of illustrative embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for identifying issues in products.

A. Computing Environment

Figure 1B:
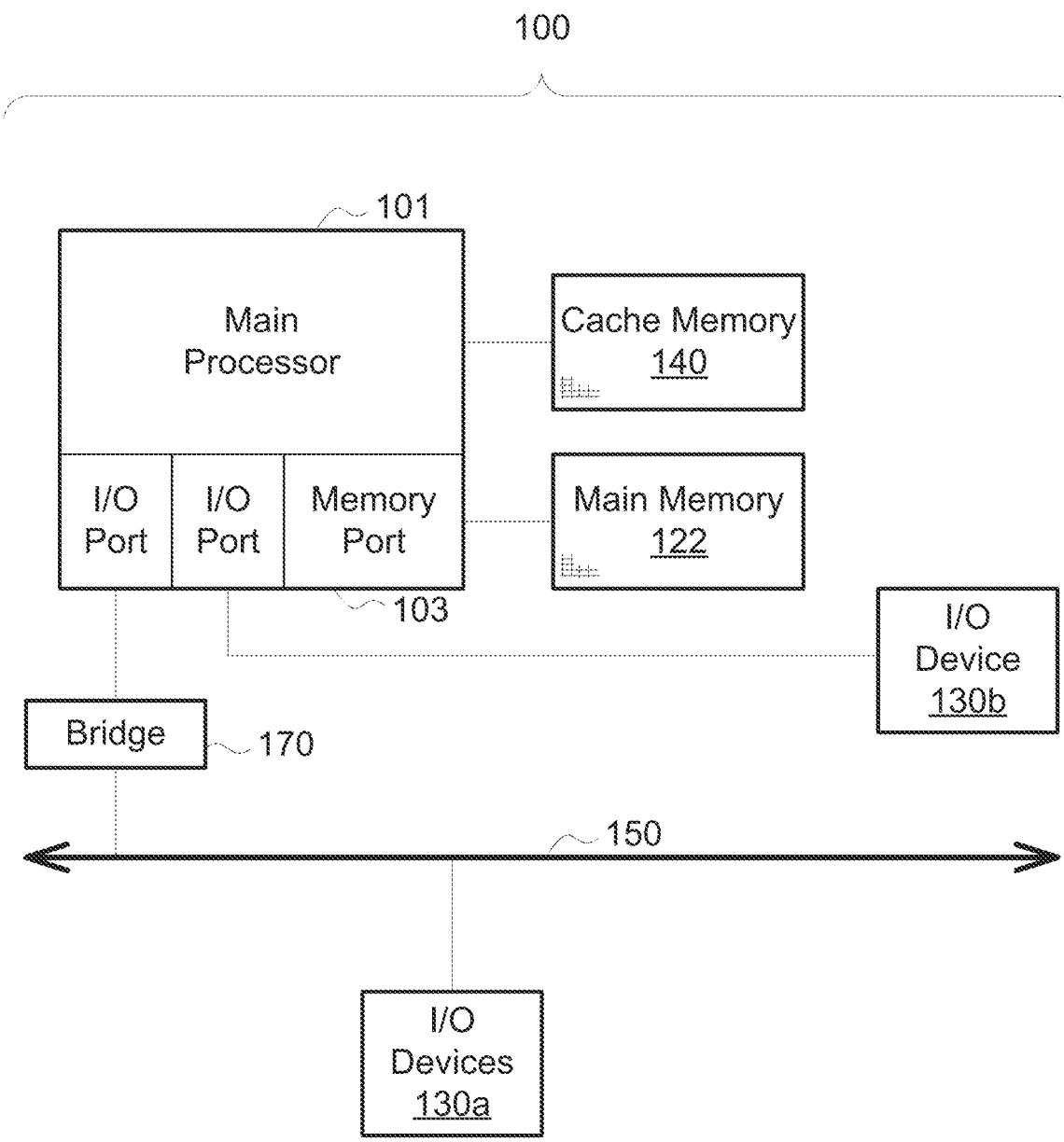

Prior to discussing the specifics of embodiments of the systems and methods of identifying issues in products, it may be helpful to discuss the computing environments in which such embodiments may be deployed. FIGS. 1A and 1B depict block diagrams of a computing device 100 useful for practicing embodiments of the systems, methods and devices described further below in Section B. As shown in FIGS. 1A and 1B, each computing device 100 includes a central processing unit 101, and a main memory unit 122. As shown in FIG. 1A, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101. In some embodiments, the input/output devices 130a-130b can include audio output devices, such as a speaker, headphones, or an audio output port configured to communicatively couple with an external audio output device.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Samsung Electronics of Suwon, Korea; those manufactured by Micron Technology of Boise, Id.; those manufactured by Transmeta Corporation of Santa Clara, Calif.; those manufactured by International Business Machines of White Plains, N.Y.; or those manufactured by Advanced Micro Devices of Sunnyvale, Calif., among others. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 101 communicates with main memory 122 via a system bus 150 (described in more detail below). FIG. 1B depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1B, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1B depicts an embodiment of a computer 100 in which the main processor 101 communicates directly with I/O device 130b via HyperTransport, Rapid I/O, or InfiniBand. FIG. 1B also depicts an embodiment in which local busses and direct communication are mixed: the processor 101 communicates with I/O device 130b using a local interconnect bus while communicating with I/O device 130a directly.

The computing device 100 may support any suitable installation device 116, such as a CD-ROM drive, a CD-R/RW drive, a DVD-ROM drive, tape drives of various formats, USB device, hard-drive or any other device suitable for installing software and programs. The computing device 100 may further comprise a storage device 128, such as one or more hard disk drives or redundant arrays of independent disks, for storing an operating system and other related software, and for storing application software programs. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif. or SanDisk Corporation of Milpitas, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. A computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B can operate under the control of operating systems, which can control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, and WINDOWS 10, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a UNIX operating system, among others.

In other embodiments, the computing device 100 may have different processors, operating systems, and input devices consistent with the device. For example, in one embodiment the computer 100 may be a smartphone or a tablet, such as those developed by Apple Inc., by Samsung Electronics, by Xiaomi. Inc., or by Google Inc., among others. In this embodiment, the smartphone or tablet may be operated under the control of an operating system (such as Android or iOS) and may include a stylus input device as well as a touch sensitive screen. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1C:
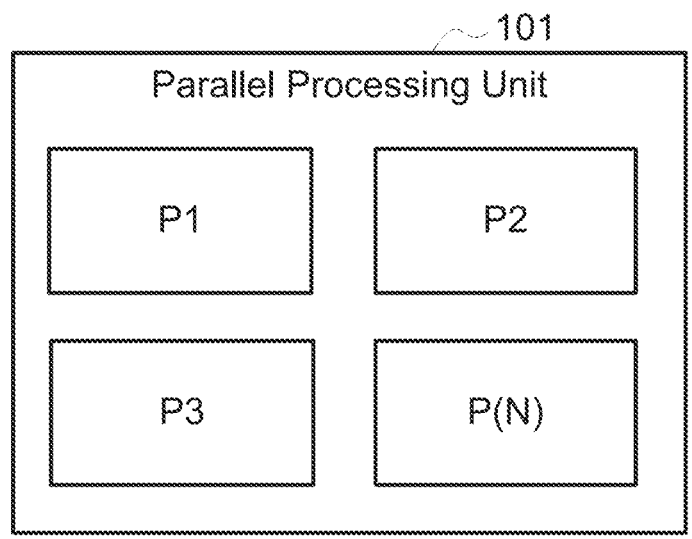

As shown in FIG. 1C, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a Cell Broadband Engine architecture and including a Power processor element and a plurality of synergistic processing elements, the Power processor element and the plurality of synergistic processing elements linked together by an internal high-speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1D:
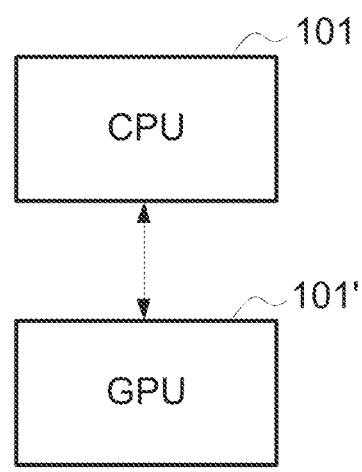

In some embodiments, the computing device 100 may comprise a graphics processing unit. In one of these embodiments depicted in FIG. 1D, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Identifying Issues in Products

The present solution provides a data processing system configured with data analytics techniques that can be used to improve international software product quality and user experience. The data processing system can use data mining techniques to identify and assess region-specific issues in a software product. For example, the data processing system can use predetermined keywords, patterns and neural networks to mine customer feedback from heterogeneous data sources in order to accurately and efficiently identify and assess technical problems in a software product. The data processing system, upon mining the data sources to determine the usage patterns and expectations that led to the identified technical problems, can facilitate the development of a software update or patch for the software product that can solve or mitigate the identified technical problem, resulting in the software product having improved globalization maturity and international user experience.

The level of satisfaction a customer has with a software product can vary based on the customer's usage patterns and expectations with the software product. These usage patterns and expectations can vary from customer to customer due to the different geographic regions or settings in which the software product may be executed or used, as well as the different languages, characteristics or attributes associated with the usage of the software product. For example, usage patterns or expectations of a software product might different for international, non-English speaking users, or use of a software product in a different country such as Japan or Germany where English is not the primary spoken language, as compared to English speaking users that are using the software product in a country where English is the primary spoken language, such as the United States or England. Due to various usage patterns and expectations, it can be challenging to accurately or efficiently determine the difficulties faced by an international customer. Further, due to the various heterogeneous feedback data sources and large volume of feedback, it can be challenging to efficiently analyze the feedback from English language customers and customers using the software product in international markets where the English language is not widely spoken to identify the technical problems faced by the international user. Thus, the data analytics techniques and tools utilized by the data processing system of the present solution can mine heterogeneous feedback data sources to showcase the keywords associated with usage patterns or difficulties of the international users. By showcasing these keywords, the data processing system can facilitate the development of a technical solution for the software product.

The data processing system of the present solution can enumerate the mined feedback to showcase where regional users (e.g., non-English language users) are facing problems and what are the areas the engineering development team should focus more on for increasing the globalization maturity of a software product and improve the customer satisfaction for the international customers. The process performed by the data processing system can begin with mining the feedback provided by international customers (e.g., non-English language/regional customers). The data processing system can mine data from a large data repository (which contains both "English" and "non-English" customer feedback). The large data repository can include data obtained from several heterogeneous data sources, including, for example, online public forums, ratings in online application marketplaces, internal customer escalation database (customer cases), customer support tickets, or customer support e-mails.

The data processing system can use a neural network to analyze the voluminous feedback from heterogeneous sources to identify categories of sentiment (e.g., positive, neutral, or negative). The sentiment can be indicative of an issue (e.g., identifying negative sentiment from a customer support voice call can indicate a problem, issue or other case with the software product).

Based on identifying the sentiment, the data processing system can further identify attributes associated with the sentiment, such as keywords or patterns. The data processing system can access a predetermined set of keywords. The keywords may have established by an administrator of the system based on an analysis of a large volume of historical customer data, which are used to mine customer feedback to assess globalization issues or usability issues related to Globalization quality of the software product. The data processing system can then enumerate the mined feedback into categories corresponding to the keywords or patterns.

The data processing system can query the data repository, and update a database with the queried outcome. The data processing system can use the stored, queried outcome to generate an electronic dashboard with one or more charts. These charts can facilitate developing updates or patches to the software products in order to improve the globalization quality of a software product, thereby improving the user experience of regional customers. Indeed, by identifying the issues and updating the software product, the improved software product can result in reduced processor utilization, memory utilization, and bandwidth utilization at least by virtue of more efficiently and accurately providing the desired function, and by reducing the number of electronic complaints, customer support communications, or repeated or redundant attempts at performing the desired function. As such, the systems and methods of the present solution provide an improvement to technology at least by way of improving the software product.

Figure 2:
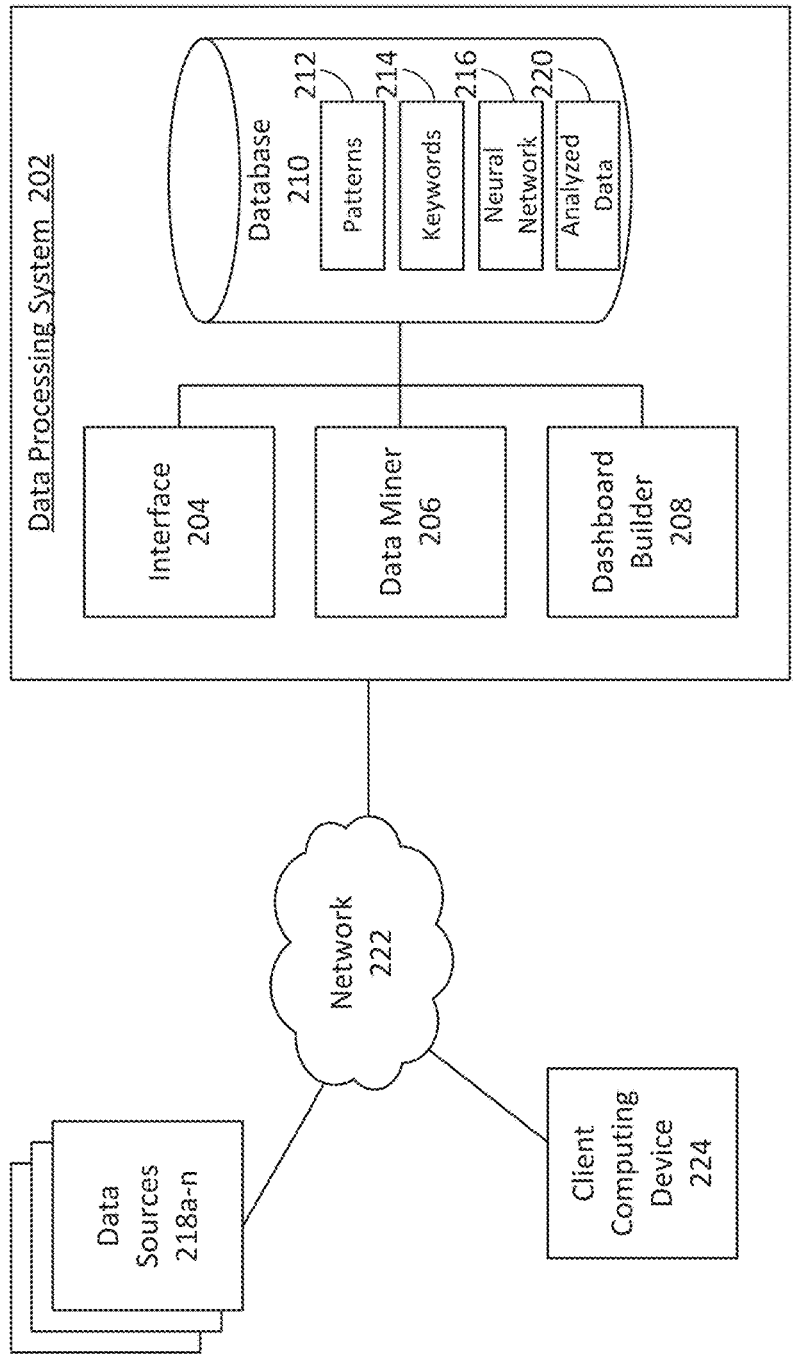
FIG. 2 is a block diagram of a system to identify issues in products, in accordance with an illustrative embodiment.

FIG. 2 is a block diagram of a system to identify issues in products, in accordance with an illustrative embodiment. In brief summary, the system 200 includes a data processing system 202. The data processing system 202 can include one or more component, element, module or function depicted in FIGS. 1A-1D. The data processing system 202 can be implemented using hardware, software, or a combination of hardware and software. In some embodiments, each component of the system 200 can be implemented using the hardware or a combination of the hardware or software detailed above in connection with FIGS. 1A-1D. For example, in some embodiments, the interface 204, data miner 206 and dashboard builder 208 can include any application, program, library, script, task, service, process, or any type and form of executable instructions executing on hardware of the data processing system 202. The hardware can include circuitry such as one or more processors in one or more embodiments. For example, the data processing system 202 can include one or more processors or memory. The data processing system can include or execute on one or more servers. The one or more servers can be part of a server farm or data center.

In some embodiments, functionality of system 200 can be combined such that the functionality of the two or more of components of system 200 depicted in FIG. 2 can be implemented by a single device. For example, the client computing device 224 can execute an instance of the data miner 206 or the dashboard builder 208, and store (or have access to) the database 210.

The data processing system 202 can include, execute, access or otherwise utilize an interface 204 to obtain data from heterogeneous data sources. The data processing system 202 can include, execute, access with or otherwise utilize a data miner 206 to analyze the obtained data. The data processing system 202 can include, execute, access or otherwise utilize a dashboard builder 208 to generate or populate an electronic dashboard with the outcome of the analyzes performed by the data miner 206. The data processing system 202 can include, execute, access or otherwise utilize a database 210. The database 210 can include or store one more data files or data structures in a storage device or memory. The database 210 can be configured with one or more file systems. The database 210 can include one or more data files or data structures storing patterns 212, keywords 214, neural network information 216, and analyzed data 220. In some cases, the database 210 can store the data obtained from the heterogeneous data sources 218a-n for future processing by the data processing system 202.

The system 200 can include, access or otherwise interface with one or more data sources 218a-n. The data sources 218a-n can refer to heterogeneous data sources. The data sources 218a-n can be heterogeneous data sources in that they may be different data sources, different types of data sources, contain different types of data, different data formats, located at different places, etc. For example, data sources 218a-n can include customer escalation cases databases, electronic messages or mail, social media, public forums, customer feedback or ratings in an online application marketplace, voice calls, chatbot information, or other sources or indications of feedback.

The system 200 can include, access or communicate with one or more client computing devices 224. The client computing device 224 can include one or more component or functionality depicted in FIGS. 1A-1D. The client computing device 224 can render or display the electronic dashboard, or graphical output thereof, provided by the data processing system 202. The client computing device 224 can receive input via an input device (e.g., I/O devices 130a or 130b).

The data processing system 202 can communicate with data sources 218a-n or client computing device 224 via network 222. The network 222 can include any type or form of network. For example, such communications can be carried out via any type of network capable of supporting communications between the data processing system 202, the data sources 218a-n, and the client computing device 224. In some embodiments, the communications can be performed via any of a local-area network (LAN) (e.g., a company Intranet), a metropolitan area network (MAN), or a wide area network (WAN) (e.g., the Internet).

The data processing system 202 can include an interface 204 configured to obtain data from one or more data sources 218a-n. The interface 204 can receive the data from multiple heterogeneous data sources 218a-n. Data sources 218a-n can include, for example, a database of customer escalation cases, electronic mails, social media and public forums, or customer feedback and ratings. The customer feedback or ratings can be obtained via an online application delivery marketplace. The data processing system 202 can poll the one or more data sources 218a-n for the data. The data processing system 202 can transmit a request to the data sources 218a-n. The request can include a request for data. The data processing system 202 can generate and transmit requests for data to the data sources 218a-n based on a time interval or periodically (e.g., every 1 minute, 2 minutes, 5 minutes, 10 minutes, 30 minutes, 1 hour, 2 hours, 6 hours, 12 hours, 24 hours, 48 hours, 72 hours, etc.). In some cases, the data sources 218a-n can push new data to the data processing system 202 as the data sources 218a-n receive, obtain, identify or generate the data.

The data provided by the data sources 218a-n can include information that can facilitate identify issues or problems in or associated with the software product. The data can provide, include or otherwise indication information associated with a software product. For example, the data obtained from the one or more data sources 218a-n can include feedback information about one or more software products. The data obtained by the interface 204 from the one or more data sources 218a-n can be in one or more formats or languages. For example, the data can be in different languages.

The data, such as feedback data, can include a timestamp, location information, language information, product identifier, or other meta data that can be analyzed or used by the data processing system 202 to identify issues with a software product, and enumerate or categories the issues. The data can include voice data, text data, keywords, phrases, binary feedback information, sentiment data, ratings data, scores, or other data indicative of feedback.

For example, the feedback data can be generated from voice input provided by one or more customers. The customer may have provided the voice input during a phone call, telecommunication, voice call, video call, or other communication channel. For example, the customer may have contacted a support technician, customer support provider, or technical help desk. The data processing system 202 or data source 218a-n can record the voice call, and use a speech-to-text conversion program to convert the spoken voice into text. In some cases, the data processing system 202 or data source 218 can be configured with a natural language processing program. The data processing system 202 can determine the language of the voice input, and use the language information to establish a category that identifies issues by different languages.

The data can include state information associated with the software product. State information can include or refer to a sequence of states of the software product. For example, the state information can include or indicate a selection of a graphical user interface element, such as a button or widget. The state information can include an operating state of the software product. The state information can include information about a query, keyword or selection that resulted in a state of a software product.

Additional examples of feedback can include a user quitting the software product prior to a desired result, force quitting the software product, requesting help during the software product, repeating sequence of events in the software product, repeating a sequence of events in the software product responsive to an undesired result in the software product.

Examples of feedback can include the user accessing an online public forum (e.g., social media platform) to discuss an aspect of the software product. Input from multiple users into the public forum can be aggregated to generate a data source, such as one of the data sources 218a-n. For example, users of the software product can post or provide, to the online public forum, comments or feedback regarding the software product. The data processing system 202, via interface 204, can scrub, parse or crawl the online public forum to obtain feedback about the software product.

The data processing system 202 (e.g., via interface 204) can store the data in database 210. The data processing system 202 may or may not store the data in the database 210 for further processing. The data processing system 202 can pre-process, index or otherwise manipulate the data obtained from the data sources 218a-n prior to storing the data in the database 210. The data processing system 202 can pre-process, index or otherwise manipulate the data prior to storing the data in the database 210 in order to facilitate downstream processing of the data. For example, the data processing system 202 can parse or process the data from each of the data sources 218a-n to identify one or more keywords, and store the keywords in the database 210. The data processing system 202 can convert the data from each of the data sources 218*a*-*n* into a common format for further processing. The further processing can be performed by the data processing system 202, or component thereof, such as the data miner 206 or dashboard builder 208. Thus, the data processing system 202 can obtain the data from one or more data sources 218*a*-*n*, and store the data in a repository, such as database 210. The data processing system 202 may or may not manipulate, convert, or otherwise pre-process the data prior to storage in the repository.

The data processing system 202 can include a data miner 206 designed, constructed, configured and operational to identify one or more keywords and patterns to use for mining the feedback stored in the repository. The data miner 206 can mine the feedback stored in the repository using a neural network and the keywords and the patterns. The data miner 206 can enumerate, responsive to the mining, the feedback stored in the repository into categories. One or more of the categories can identify issues by different languages.

The data miner 206 can use a neural network to mine the feedback from the data sources 218*a*-*n*. The data miner 206 can use the neural network to determine a sentiment associated with the feedback. The data miner 206 can categorize the sentiment into positive, negative or neutral sentiment. The data miner 206 can use the neural network to otherwise categorize the feedback into positive or negative feedback, or just negative feedback. By identifying the negative feedback, the data processing system 202 can use the neural network to identify potential issues, problems or cases that may be negative associated with the software product.

The data processing system 202 can train a neural network model using historical data, such as historical feedback data. The data processing system 202 can use the neural network model to analyze the feedback from the data sources 218*a*-*n* to identify the negative sentiment, positive sentiment or neutral sentiment. For example, the data processing system 202 can use a word-to-vector ("word2vec") process. The word2vec process can be used to train a neural network to perform the analysis on the feedback. The word2vec process can be used to determine weights.

The data minor 206 can generate a vector space model to represent words in a continuous vector space where semantically similar words are mapped to nearby points. Thus, feedback data from a data source 218*a* that includes terms that map to a vector space corresponding to negative sentiment can indicate that the feedback from the user was negative. The data processing system 202 can flag the feedback as negative (or assign a flag or tag indicating that the feedback is negative) and store the feedback with the flag in the database 210. The data processing system 202 can further identify attributes associated with the negative feedback, where the attributes can correspond to a predetermined list of patterns or keywords (e.g., language, region, or software configuration). The data processing system 202 can identify all negative feedback obtained from the data sources using the neural network, and then enumerate the negative feedback in accordance with one or more categories corresponding to the predetermined pattern.

The data miner 206 can obtain, retrieve, access or identify the keywords from a keywords data structure 214 (or database, or data file stored) in database 210. The data miner 206 can obtain, retrieve, access or identify the patterns from a patterns data structure 212 (or database, or data file) stored in database 210. The data miner 206 can utilize the keywords, patterns and a neural network to analyze the feedback and enumerate the feedback into one or more categories.

A pattern can include or refer to a pattern associated with an issue in the software product. A pattern can be formed of one or more keywords. A pattern can refer to a correlation between a keyword and an issue. The pattern can be based on a type of keyboard or configuration of a keyboard used to interface with the software product. The pattern can be based on aggregated associated with many different customers or different data sources. In some cases, the pattern can be associated with a single software product. In some cases, the pattern can be associated with multiple different software products.

Example patterns can include Unicode, translation, truncation, double-byte character set ("DBCS"), non-English, locale, or input method editor ("IME"). Example keywords can include type of operating system or computing platform, such as WINDOWS, iOS, LINUX, or ANDROID. Example keywords can also include languages, such as Chinese, Japanese, French, German, Korean, NL Dutch, etc. Additional patterns or keywords can include, for example, whether the software product is configured for internationalization I18N (e.g., the process of developing products in such a way that they can be localized for languages and cultures easily or efficiently), or Localization L10n (e.g., the process of adapting applications and text to enable their usability in a particular cultural or linguistic market).

Additional patterns or keywords can include a type of input device used to interface or provide input to the software product. Types of interface can include, for example, keyboard, mouse, multi-touch interface, gesture interface, multi-user interface, etc. Patterns or keywords can be based or include a configuration of the user interface. For example, patterns or keywords can be generated or identified based on a mechanical layout of a keyboard (e.g., the physical layout of the keys), such as ISO mechanical layout, ANSI mechanical layout, JIS mechanical layout, QUERTY-based Latin-script keyboard layout, QWERTZ layout, AZERTY layout, QZERTY layout, Dvorak Simplified Keyboard layout, etc. Patterns or keywords can further be based on a functional layout of the keyboard (e.g., a mapping between the physical keys and a software event), such as switching to a different language (e.g., switching a Swedish keyboard to German). Keywords or patterns can further be based on customized functional layouts, such as an overlay keyboard or transliteration (e.g., letters in other language matched to visible Latin letters on the keyboard by the way they sound). Keywords or patterns can include at least one of Unicode, translation, truncation, double-byte character set, non-English, locale, or input method editor.

Additional keywords or patterns can include, for example, geographic region or location information, such as a country in which the software product is being used or accessed (e.g., Denmark, France, Germany, Italy, Netherland, Poland, Russia, Spain, Sweden, etc.). The data processing system 202 can identify keywords or patterns based on an internet protocol address ("IP address") associated with the device, geographic coordinates, an address, or Global Positioning Systems coordinates. In some cases, the data processing system 202 or software product can provide a prompt for additional information. The additional information can include language information, location information, hardware configuration information, computing environment, type of business, issue, complaint, feedback, etc.

An illustrative example of keywords, keyboards, or patterns used to analyze or mine the data using a neural network can include: European, Multi-user Interface, AltGr, Not-EN, Foreign, JPN, Umlaut, Hangul, Hanja, East-Asian, East Asian, Daylight, ANSI, ASCII, Calendar, Character, Corrupt, Garbage, Garbled, Cross-Browser, Cross-Language, Cultural, Culture, Cyrillic, Date, DBCS, Encoding, UTF 8, Font, Formatting, Hangual, Hardcoding, Hiragana, Hotkey, Kanji, Katakana, Keyboard, Keypad, ATOK, IME, Pinyin, Zhuyin, L10N, Localization, Localized, Amharic, Arab, Arabic, Aramaic, Brazil, Bulgarian, Catalan, Chinese, Croatian, Czech, Danish, Dutch, Estonian, Finnish, French, G11n, Georgian, German, Globalization, Greek, Hebrew, I18n, International, Irish, Italian, Japanese, Korean, Language, Mandarin, Multilingual, non-English, Polish, Portuguese, Regional, Romanian, Russian, Serbian, Spanish, Swedish, Taiwan, Thai, Turkic, Turkish, Urdu, Latin, Locale, or Mistranslation.

The data processing system 202 can mine the data based on the keywords, keyboards, or patterns. The data processing system 202 can mine the data based on the keywords, patterns and a neural network. The data processing system 202 can determine a language associated with the use of the software product, and the mine the data based on the language. The data processing system 202 can determine the language based on the keywords, keyboards or other patterns.

The data processing system 202 can mine the feedback using the keywords, patterns and neural network to enumerate the feedback into categories. The categories can be based on, determined, or derived from the keywords and patterns. For example, and as illustrated in FIG. 4C, categories used to enumerate the data can include operating system platform, language, localization vs. internationalization, encoding standard.

To enumerate the feedback into categories, the data processing system 202 can query the feedback data using the keywords or patterns. The data processing system 202 can identify, in response to a query to the database, a number of cases associated with each different platform. The data processing system 202 can query the database to determine a number of cases associated with each language, or other category or classification. The data processing system 202 can use the neural network to perform the classification, categorization, or enumeration of the feedback data using the identified keywords, keyboards, or patterns.

For example, the data processing system 202 can use or be configured with an artificial neural network. The neural network can process records or entries in the feedback data. During an initial learning phase, the neural network can process the records one at a time, and learn by comparing the classification of the record as determined by the neural network with a known actual classification of the record. The errors from the initial classification of the first record can be fed back into the network, and used to modify the algorithm of the network for further iterations. For example, a neuron in the artificial neural network can include (1) a set of input values and associated weights; and (2) a function that sums the weights and maps the results to an output. Neurons can be organized into layers: input, hidden and output. The input layer can be composed not of full neurons, but rather the record's values that are inputs to the next layer of neurons. The next layer can be the hidden layer. Several hidden layers can exist in one neural network. The final layer can be the output layer, where there is one node for each class. A single sweep forward through the network can result in the assignment of a value to each output node, and the record is assigned to the class node with the highest value (e.g., the category or sub-category depicted in FIG. 4C).

The data processing system 202 can use pattern classification, artificial neural networks, perceptron learning, machine learning, or logistic regressions to mine the feedback. The data processing system 202 can use the neural network to perform sentiment analysis. For example, the data processing system can use a word2vec process, vector space model, logistic regression, probabilistic latent semantic analysis, or other machine learning algorithm to determine a sentiment associated with one or more feedback data.

The data processing system 202 can use a semantic analysis algorithm, technique or processing to analyze the feedback information. For example, the data processing system can use semantic analysis to enumerate the feedback information into one or more of a negative sentiment category (e.g., user has a bad feeling about the product; unhappy with the product), a neutral sentiment category (e.g., user is neither unhappy nor happy with how the product works or is functioning), or a positive sentiment category (e.g., the user is happy with how the product is functioning). Sentiment analysis can include analyzing keywords or patterns in the feedback to determine a sentiment. Sentiment can refer to a view, feeling, or attitude associated with the software product. For example, the user may be unhappy with the software product, which may have caused the user to provide the feedback information. The user's unhappiness with the software product can be captured in the keywords used by the user, such as "poor quality", "not working", "software product crashes", "software product provides erroneous results", "software product confusing", "software product difficult to use", etc. The data processing system 202 can use a sentimental analysis technique to determine that this type of feedback corresponds to a negative sentiment.

In some cases, the data processing system 202 can use a sentiment analysis technique that includes generating an electronic prompt or survey for presentation to the user. The user can respond to the survey or prompt by providing sentiment feedback, which the data processing system 202 can log with the record or entry associated with the feedback.

Thus, the data processing system 202 can analyze or mine the feedback data to enumerate the feedback into one or more categories. Enumerating the feedback data can refer to or include listing information in one or more categories or sub-categories. Categories can include, for example, keyword, pattern, a type of issue or a severity of the type of issue. Enumerating feedback data can include aggregating information and listing the aggregated information in the one or more categories. Enumerating the feedback data can include determine statistical information or metrics associated with the categorized feedback data. The data processing system 202 can enumerate data for time interval, predetermined time window, or duration (e.g., 30 days, 1 month, 60 days, 2 months, 24 hours, 72 hours, 1 week, etc.). The data processing system 202 can compute statistical information associated with the categories that includes, for example, a percentage, standard deviation, average, percentile, variance, etc.

The data processing system 202 can include a dashboard builder 208 designed, constructed, configured and operational to generate graphical output to display the feedback data enumerated by the data miner 206. The dashboard builder 208 can generate graphical output that includes an electronic dashboard. The electronic dashboard can include an enumeration of the feedback in the one or more categories. The one or more categories can identify issues by different languages, for example, among other categories should the feedback be enumerated into additional categories. The data processing system 202 can transmit, via a network, the graphical output to a client computing device 224. The client computing device 224, upon receiving the graphical output, can render the graphical output for display via a display device.

The dashboard builder 208 can generate an electronic dashboard that enumerate the feedback into one or more categories. The feedback enumerated into categories by the dashboard builder 208 can be a set of feedback corresponding to a sentiment. For example, the dashboard builder 208 can enumerate negative sentiment feedback into one or more categories. The dashboard builder 208 can enumerate positive sentiment feedback into one or more categories. The dashboard builder 208 can enumerate neutral sentiment feedback into one or more categories. The dashboard builder 208 can generate multiple electronic dashboards for the different sentiment, or allow a user to interactively toggle between different sentiments. The dashboard builder 208 can combine the enumeration of feedback with different sentiments into a single electronic dashboard.

The dashboard builder 208 can generate the electronic dashboard using a template. The dashboard builder 208 can use a default template for the electronic dashboard, or select a template based on the types of categories or number of categories into which the feedback data is enumerated by the data miner 206. In some cases, the dashboard builder 208 can use a policy to select a template with which to build the electronic dashboard. The template can include a layout for the electronic dashboard, with fields or placeholders. The dashboard builder 208 can populate the fields or fill the placeholders with information provided by the data miner 206. In some cases, the data miner 206 can store the results of the mining analysis in the database 210 such that the dashboard builder 208 can retrieve the results when building the electronic dashboard.

The dashboard builder 208 can use or access a mapping stored in database 210 that maps a type of category to a display template that can be used to build the electronic dashboard. The electronic dashboard template can include multiple slots in which to display the enumerated feedback data. The dashboard builder 208 can obtain a layout for the electronic dashboard that includes multiple slots in an arrangement. The dashboard builder 208 can further obtain, for each slot, layout information. The layout information for each slot can be specific to the type of information to be enumerated in the slot.

The dashboard builder 208 can build an electronic dashboard that can display text, icons, graphs, charts, images, or multimedia information. The dashboard builder 208 can build an interactive electronic dashboard that includes input widgets, such as buttons, input text boxes, drop down menus, or other input mechanisms. The user of the client computing device 224, using the input widget, can interact with the electronic dashboard in order to manipulate the display, change a format of the electronic dashboard, obtain additional or different information, filter information, scroll a list, or paginate through a list. In some cases, the user of the client computing device 224 can refresh the electronic dashboard, which can cause the data processing system 202 to instruct the interface 202 to request or obtain new, updated data from data sources 218a-n, and then invoke the data miner 206 to analyze the data using the keywords, patterns and neural network, and then provide the new enumeration of the feedback data to the dashboard builder 208 to allow the dashboard builder 208 populate the electronic dashboard with the new feedback data.

The dashboard builder 208 can generate the electronic dashboard to be an interactive electronic dashboard. The interactive electronic dashboard can include graphical user elements to allow a user to provide (e.g., via client computing device 224) input such as a selection or input text. For example, the dashboard builder 208 can generate the interactive electronic dashboard with the feedback data enumerated into sentiment categories. The sentiment categories can include a negative sentiment category. The user can select the negative sentiment category. Responsive to receiving the selection of the negative sentiment category, the data processing system 202 can generate updated graphical output for the interactive electronic dashboard that includes an indication of one or more languages associated with the negative sentiment category. The data processing system 202 can retrieve, from the database 210 or data miner 206, an enumeration of the languages associated with the negative sentiment, and generate graphical output to display or enumerate these languages. Based on the selection received via the interactive electronic dashboard, the data processing system 202 can enumerate the feedback data associated with negative sentiment into one or more categories, such as type of operating system, language, keyboard configuration, patterns, etc.

The dashboard builder 208 can generate the electronic dashboard with an indication of one or more languages that are error prone for the one or more products. The languages can include or some or all of the languages identified via mining the feedback data provided by data sources 218a-n. The languages displayed in the electronic dashboard can include a subset of all languages identified in the data sources 218a-n, which, in-turn, may include a subset of all languages in which the software product may be used or in which feedback data may be provided. For example, the data miner 206 can mine the feedback data to identify 5 languages associated with the most issues, rank the 5 languages by the number of issues associated with the language, and then display, in the electronic dashboard, the number of issues associated with each language. The data processing system 202 can determine the language using the keywords, keyboard information or patterns. For example, the data processing system 202 can determine the language associated with the issues based on the language in which the feedback is provided, location information associated with the source of the feedback, a configuration of the keyboard used to provide the feedback, keywords in the feedback (e.g., an indication of the primary language of the user of the software product that had the issue). Thus, the data processing system 202 can generate the electronic dashboard with indications of one or more areas that are error prone or associated with issues, such as keyboard configuration, Unicode, or right-to-left.

Figure 3:
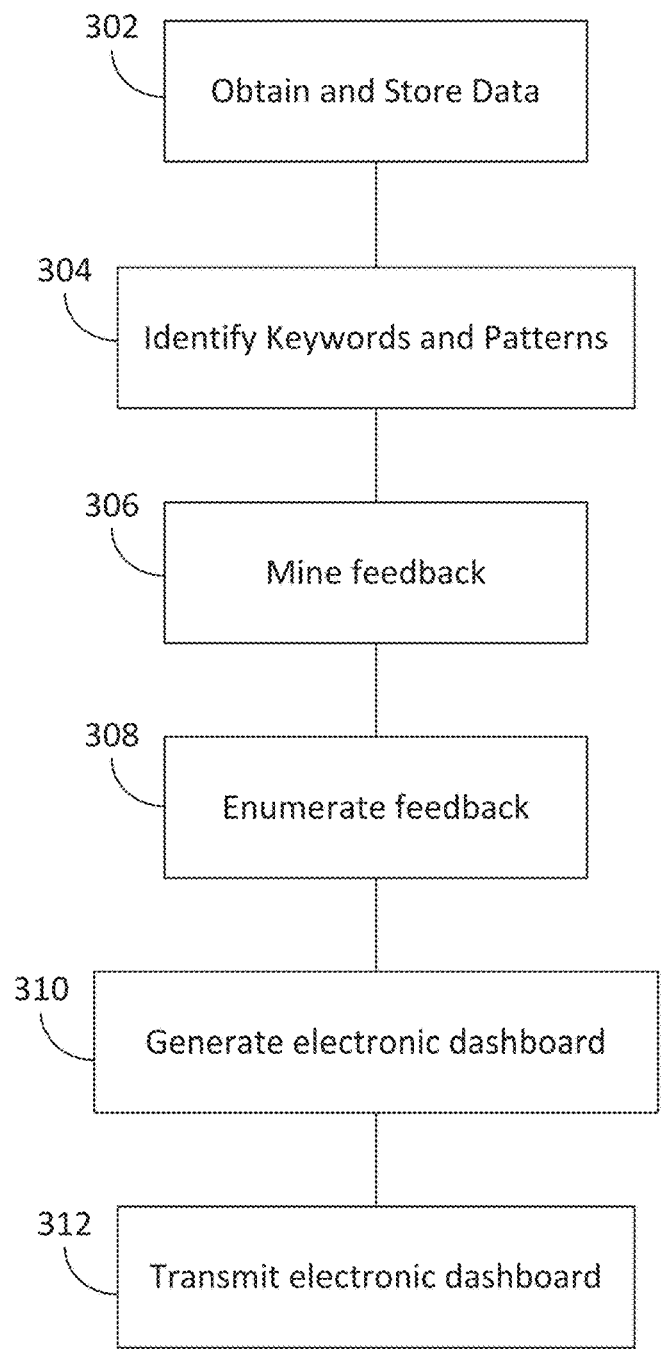
FIG. 3 is a block diagram of a method to identify issues in products, in accordance with an illustrative embodiment.

FIG. 3 illustrates a block diagram of an example method 300 to identify issues in a product. The method 300 can be, for example, performed with the systems illustrated in FIGS. 1A-2A. In brief overview, and in some embodiments, the method 300 can be performed by a data processing system, interface, data miner, dashboard builder or database. At step 302 of the method 300, a data processing can obtain data. At step 304 of the method 300, the data processing system can identify keywords and patterns. At step 306 of the method 300, the data processing system can mine feedback. At step 308 of the method 300, the data processing system can enumerate feedback. At step 310 of the method 300, the data processing system can generate an electronic dashboard. At step 312 of the method 300, the data processing system can transmit the electronic dashboard.

Still referring to FIG. 3, and in further detail, a data processing can obtain data at step 302 of the method 300. The data can include feedback data. The data can include customer feedback. The data can include activity or state information associated with the software product. The data can include logs associated with the software product. The data can include support tickets, records, error logs, data logs, historical use, debugger reports, error reports, or other information associated with execution or running of a software product. The data processing system can receive or obtain the data from one or more data sources. The data sources can be a same type of data source or heterogeneous data sources, such as email, customer escalation database records, support tickets, voice calls, line social network platform, public forums, feedback input into an online application marketplace, etc. The data sources can provide feedback data in different languages, or provide feedback data that indicates use of the software product by users that primarily speak a different language (e.g., non-English speakers). The data sources can each aggregate the feedback data prior to providing the feedback data to the data processing system. In some cases, the data processing system can receive a real-time feed or stream of the feedback data from each data source. For example, as the data source receives feedback data source can stream or transmit the feedback to the data processing system in real-time (e.g., responsive to receiving the feedback, within 1 minute of receiving the feedback, within 5 minutes of receiving the feedback, or within 10 minutes of receiving the feedback). In some cases, the data sources can provide the feedback data periodically or based on a time interval (e.g., 1 hour, 6 hours, 12 hours, 24 hours, 48 hours, 72 hours, etc.).

In some cases, the data sources can pre-process the feedback data before the data processing system obtains the feedback data. Pre-processing the feedback data can include, for example, converting the feedback into a common format or a format that is better suited for transmission to the data processing system. The data source can convert the feedback data into a format that occupies a smaller file size, so that transmission of the data to the data processing system can utilize less bandwidth, thereby improving the efficiency of the network. Examples of reducing the file size can include converting feedback obtained via voice input into a text format, and then providing the text to the data processing system. In another example, the voice input can be converted from a first audio format to a second audio format that requires less file size by, for example, reducing the sampling rate or using a different encoding (e.g., converting from a lossless encoding to a lossy encoding such as MP3).

The data processing system can poll or transmit requests to the data sources for feedback data. The data processing system can poll or transmit request for data based on a time interval, such as every 1 minute, 5 minutes, 10 minutes, 20 minutes, 30 minutes, 1 hour, 3 hours, 6 hours, 12 hours, 24 hours or some other time interval that facilitates identifying and enumerating issues into categories via an electronic dashboard. In some embodiments, and depending on the type of data source, the data processing system 202 can crawl or scrub the data source. For example, the data source can be a public forum that is provided on a web page having a web address on a web domain. The data processing system can access the web page, obtain the HTML or other code for the web page, and then either parse, scrub, or crawl the HTML or code, or render the web page and then parse the rendered web page to obtain feedback information.

Upon obtaining the data from the data sources, the data processing system can store the data in a repository. The data can include feedback data, which can be stored in the repository. The data processing system can pre-process the data prior to storing in the database to facilitate retrieval and mining of the data. For example, the data processing system can store the feedback data with meta data associated with obtaining the feedback data, such as an identifier of the data source, date stamp, time stamp, location information, etc. The data processing system, in some cases, can remove identifying information, such as usernames, in order to anonymize the data. In some cases, the data source provider can anonymize the data prior to transmitting to the data processing system.

At step 304 of the method 300, the data processing system can identify keywords and patterns. The data processing system can identify keywords and patterns to use for mining the feedback stored in the repository The keywords and patterns can be stored in the database. The keywords and patterns can be predetermined keywords and patterns. For example, the administrator of the data processing system can identify the keywords and patterns to be used to perform data mining.

In some embodiments, a pattern can include or refer to a hardware or software configuration associated with the software product or a device used to execute, access, interface with or communicate with the software product (e.g., operating system or type of device, or whether the software product was established internationalization or localization). In some embodiments, a pattern can include or refer to a protocol used to execute, access, interface with, or communicate with the software product. In some embodiments, a pattern can include one or more keywords that can indicate, for example, at least one of a hardware configuration, software configuration, protocol, or language (e.g., a method of communication that includes the use of words in a structured way). For example, patterns can include, at least one of Unicode, translation, truncation, double-byte character set, non-English language, locale, or input method editor.

At step 306 of the method 300, the data processing system can mine feedback. The data processing system can mine the feedback stored in the repository using a neural network and the plurality of keywords and the plurality of patterns. The data processing system can mine the feedback using one or more keywords. The data processing system can mine the feedback using one or more patterns. The data processing system can mine the feedback using a neural network. The data processing system can mine the feedback using the neural network and at least one keyword. The data processing system can mine the feedback using at least one pattern and the neural network. The data processing system can mine the feedback using at least pattern and at least one keyword. The data processing system can mine the feedback using at least one pattern that is formed from at least one keyword.

The data processing system can mine the feedback stored in the repository by constructing a query from at least one pattern or keyword. The data processing system can query the feedback using the constructed query. The data repository can, responsive to the query, provide a response or result. The result can be responsive to the query. The result can include an enumeration of the mined feedback or information to facilitate enumerating the feedback.

At step 308 of the method 300, the data processing system can enumerate the feedback. The data processing system can enumerate, responsive to the mining, the feedback stored in the repository into one or more categories. At least one of the categories can identify issues by the different languages. The data processing system can enumerate the feedback by listing the categories and further identifying a number of occurrences in each of the categories.

For example, the input data from the data sources can be generated from voice input provided by customers. The data processing system can determine, from the data, the different languages of the voice input. The data may contain voice input in a single language or different languages. A single customer may use the same language throughout the voice call or conversation, or a single customer may use multiple languages during a single voice call or conversation. The data processing system can determine, from the data corresponding to the voice call, one or more languages associated with the voice input. For example, the data processing system can compare the structured words in the data, and compare the words to a pattern corresponding to a language. The data processing system can map the structure to a language. The data processing system can identify languages as English or non-English. If the data processing system identifies the language as non-English, the data processing system can further determine what the non-English is, such as German, Japanese, etc. The data processing system can establish, responsive to determining the different languages of the voice input, the one or more categories of the plurality of categories that identify issues by the different languages. The data processing system can enumerate the feedback into different languages by, for example, indicating the number of occurrences of an event associated with each of the different languages identified by the data processing system. For example, the data processing system may identify, in the feedback data, that there were 240 cases of product-related issues. The data processing system can further identify, from the feedback data, 7 different categories in which to enumerate the feedback data. The 7 categories can correspond to the top 6 languages associated with the must cases, and a miscellaneous category in which to enumerate the cases associated with the remaining languages. The data processing system can then enumerate the feedback into 7 categories as illustrated in Table 1 below.

TABLE 1

Illustrative example of feedback enumerated by languages

| Language | # Cases of Product-related issues |
|---|---|
| Chinese | 60 |
| Japanese | 55 |
| French | 40 |
| German | 35 |
| Korean | 30 |
| Dutch | 10 |
| Etc. | 10 |

As illustrated in example Table 1, the data processing system can enumerate the mined feedback into a category, such as languages. The data processing system can further enumerate the cases into sub-categories of the category Language, such as a non-English language. The data processing system can enumerate the 240 cases into 7 sub-categories as follows: Chinese—60 cases; Japanese—55 cases; French—40 cases; German—35 cases; Korean—30 cases; Dutch—10 cases; etc. —10 cases. The data processing system can construct, generate, create, or populate a data structure with the enumerated feedback data as illustrated in Table 1. In some embodiments, the data processing system can further enumerate the cases into one or more categories that correspond to at least one of a type of issue or a severity of the type of issue. In some embodiments, the data processing system can enumerate the cases by a number of occurrences, percentage of overall cases, ratio of overall cases, a grade, an indication of a rank, an indication of a number (e.g., high, medium, low), or other indicator or symbol that can provide an enumeration or an indication of an enumeration.

At step 310 of the method 300, the data processing system can generate an electronic dashboard. The data processing system can generate graphical output comprising an electronic dashboard. The electronic dashboard can include the enumeration of the feedback in the one or more categories that identify issues by the different languages, for example. The electronic dashboard can include the enumeration of the feedback in one or more other categories that can identify issues by other categories, such as a pattern, platform, hardware or software configuration, location, geographic region, etc.

The data processing system can generate the graphical output using a template. The data processing system can select a template based on the categories identified by the data processing system. The data processing system can select the template based on a preference of the end user receiving the electronic dashboard. The data processing system can select the template based on a number of categories in which to enumerate the feedback data. The data processing system can select the template based on the number of sub-categories in which to enumerate the feedback data. For example, a first level category can be languages, while a second level sub-category can include a list of the different languages with which to enumerate the cases (e.g., Chinese, Japanese, Korean, etc.).

In some embodiments, a use can customize a template. In some embodiments, the data processing system can detect or identify a configuration associated with a client device that requests the electronic dashboard, and customize the template or layout thereof based on the configuration. For example, the client device can be a tablet, laptop, desktop, or mobile computing device. Based on the type of client device, the data processing system can select a template that optimizes the transmission or rendering of the electronic dashboard. For example, the data processing system may optimize transmission for a mobile device using a cellular data network. Optimizing the transmission can include, for example, reducing the resolution of the electronic dashboard or number of graphics or multimedia content in order to reduce the amount data to be transmitted over the cellular data network, thereby improving the efficiency of the transmission and technology, as well as reducing processor and memory utilization by the client device.

In some embodiments, the data processing system can select the template based on the type of user interfaces or input devices available at the client device. For example, the data processing system can select a first user interface tailored for input via a keyboard and mouse, while selecting a second template tailored for input via a touch interface. Thus, the data processing system can select the template that can improve the user interaction based on the available user interface.

The data processing system can generate the electronic dashboard with an enumeration of the feedback into one or more categories or sub-categories. The data processing system can generate the electronic dashboard with an indication of one or more languages that are error prone for the one or more products. Error prone can refer to cases or issues associated with the software product. The data processing system can determine that a language is error prone based on identifying a large number of cases associated with the language. The data processing system can determine the number of case is large based on comparing the number of cases associated with the language with a threshold. The threshold can be a fixed threshold or a dynamic threshold. The threshold can be an absolute number (e.g., greater than 50) or a percentage (e.g., greater than or equal to 25% of total cases by language) or ratio (e.g., greater than or equal to ¼ the cases by language). The threshold can include a top N number of languages associated with the most number of cases. The threshold can refer to the language with the most number of cases.

The data processing system can generate the electronic dashboard with an indication of one or more areas that are error prone, such as keyboard, Unicode, or right-to-left. These areas can refer to categories that can be hardware or software configurations or protocols. The data processing system can, in some embodiments, enumerate the feedback using semantic analysis. The data processing system can enumerate the feedback into sentiment categories, such as negative sentiment, neutral sentiment, or positive sentiment. The sentiment categories can refer to whether a user or customer of the software product was happy with the product, or unhappy with the product. The sentiment category can refer to whether the user or customer may desire to use the product again, or not use the product. The sentiment category can refer to whether the user or customer had a positive user experience with the software product, or negative user experience with the software product. The sentiment category can, in some embodiments, refer to the user or customer's experience with other aspects associated with, or related to, the software product, such as a customer support experience. For example, the customer support experience can vary based on a primary language of the customer seeking support. The data processing system can generate the graphical output with the electronic dashboard including the enumeration of the feedback into the negative sentiment category, the neutral sentiment category, and the positive sentiment category.

At step 312 of the method 300, the data processing system can transmit the electronic dashboard. The data processing system can transmit, via a network, the graphical output to a client device. Receipt of the graphical output can cause the client device to render the graphical output for display via a display device. The client device can include a graphics driver or video card that can render the graphical output. The client device can render the graphical output using hardware or software. The client device can render the graphical output using an application or program executing on the client device. For example, the graphical output can be rendered within a web browser executing on the client device. In some embodiments, the graphical output can be rendered in a stand-alone window or application on the client device.

In some embodiments, the data processing system can authenticate the client device prior to transmitting the graphical output, or performing one or more steps herein. The data processing system can authenticate the client device based on login credentials, such as a username, password, biometric credentials, a token, key, location, or other authentication techniques. In some embodiments, the data processing system can determine permission settings associated with the electronic dashboard for the software product, and use an authentication technique (e.g., types of credential or number of factors of authentication) based on the permission settings or other configuration. In some embodiments, the data processing system can encrypt a connection between the client device and the data processing system, and then transmit the graphical output for the electronic dashboard via an encrypted communication.

The electronic dashboard can interactive. A user can interact with the electronic dashboard to manipulate the electronic dashboard, view additional information, change a format or layout, customize the electronic dashboard, customize or change labels of categories or sub-categories, provide information, remove categories, add categories, etc. The interactive electronic dashboard can be configured to receive selection via the client device, and provide responses to the selection or otherwise respond to the selection. For example, if one of the categories in the interactive electronic dashboard is sentiment, the interactive electronic dashboard can receive, via the client device, a selection of a sentiment sub-category, such as negative, positive, or neutral. Responsive to receiving the selection of the sentiment sub-category, the data processing system can generate updated graphical output of the interactive electronic dashboard. The updated graphical output of the interactive electronic dashboard can include, for example, an indication of one or more languages associated with the selection of the sentiment category (e.g., negative sentiment sub-category), or an indication of one or more patterns or keywords associated with the sentiment sub-category.

Figure 4A:
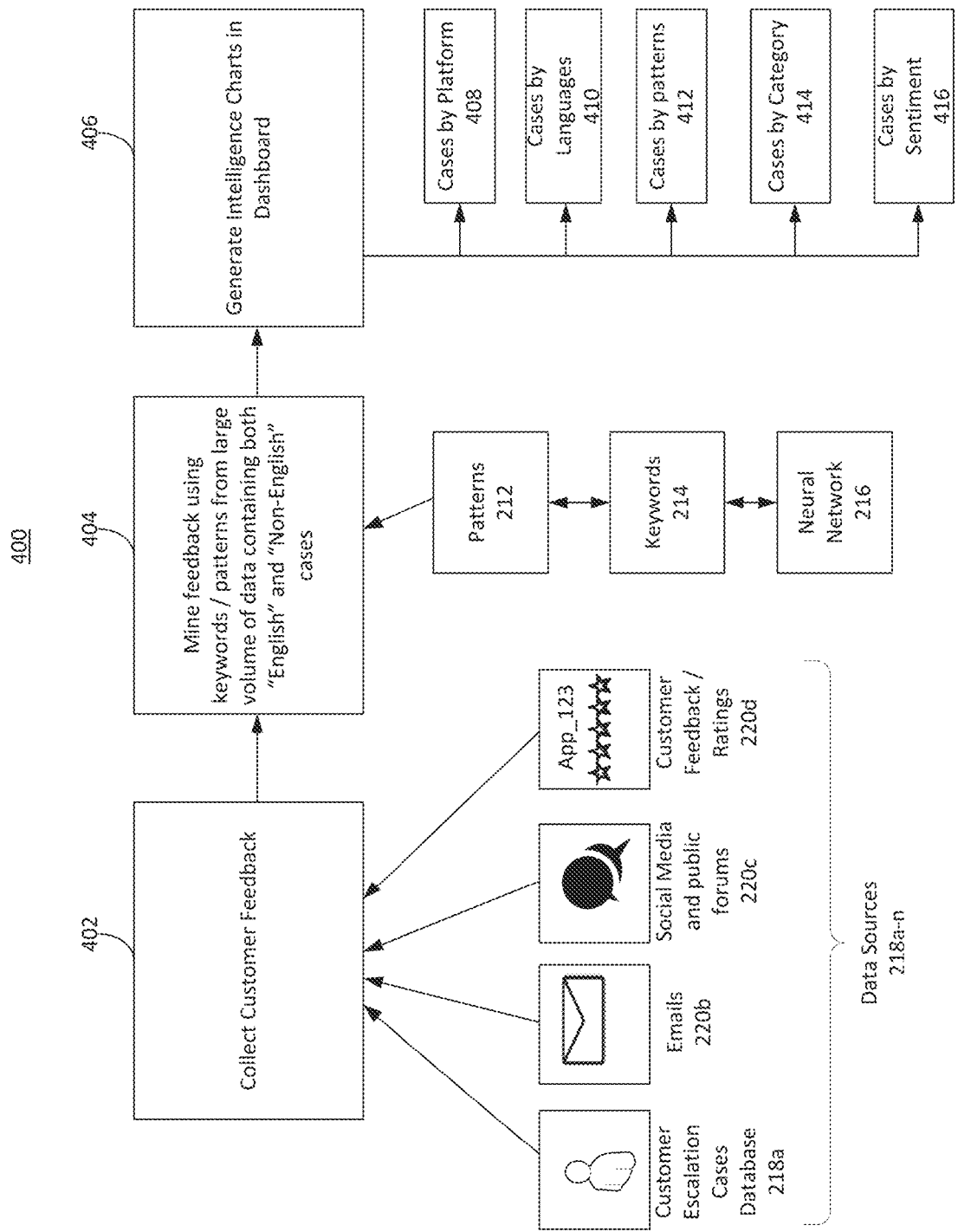
FIG. 4A is an operational block diagram of identifying issues in products, in accordance with an illustrative embodiment.

Referring now to FIG. 4A, an operational block diagram of identifying issues in products in accordance with an illustrative embodiment is shown. A data processing system can perform the operations, functions or steps illustrated in the operational block diagram 400. The operational block diagram 400 can include collecting customer feedback at block 402. The data processing system can collect customer feedback at block 402. The data processing system can collect the customer feedback from one or more data sources 218a-n. The data sources 218a-n can include, for example, a customer escalation cases databases 218a, emails 220b, social media and public forums 220c, or customer feedback/ratings 220d. These can collectively be referred to as data sources 218a-n (or data sources 218). The data processing system can receive feedback data from data sources 218a-n. The data processing system can request data from one or more of the data sources 218a-n, crawl one or more of the data sources 218a-n, query one or more of the data sources 218a-n, or poll one or more of the data sources 218a-n. The data processing system can receive or otherwise obtain the data from the data sources 218a-n at the same time, substantially the same time, synchronously, asynchronously, or as feedback at a data source 218a-n becomes available.

At block 404, the data processing system can mine feedback using keywords or patterns. The data processing system can mine the feedback from a large volume of data containing both English and Non-English cases. English cases can refer to cases associated with customers of the software product that primarily speak English, or where English is the primary language. Non-English cases can refer to cases associated with customers of the software product where the primary language is not English (e.g., a language other than English, such as Chinese or Japanese).

The data processing system can mine the feedback using patterns 212, keywords, 214, or a neural network 216. The patterns 212 or keywords 214 can be integrated with the neural network 216. The neural network 216 can be trained on the patterns 212 or keywords 214. The neural network 216 can use the patterns 212 or keywords 214 to construct queries or mine the feedback. The data processing system can include or access the neural network 216. For example, the data processing system can interface with a cloud-based neural network 216 using an application programming interface ("API"). The data processing system can generate a model using the patterns 212, keywords 214, and historical feedback data. The data processing system can provide the model to the neural network 216 along with updated or current feedback data received from data sources 218*a-n* in order to mine the feedback to identify cases, and enumerate the cases into categories and sub-categories.

At block 406, the data processing system can generate intelligence charts. The data processing system can generate a dashboard. The data processing system can generate the intelligence charts in the dashboard. The data processing system can generate the intelligence charts or dashboard with an enumeration of the cases by one or more categories or sub-categories. The categories in which the feedback data can be enumerated can include cases by platform 408, cases by languages 410, cases patterns 412, cases by category 414, or cases by sentiment 416.

Figure 4B:
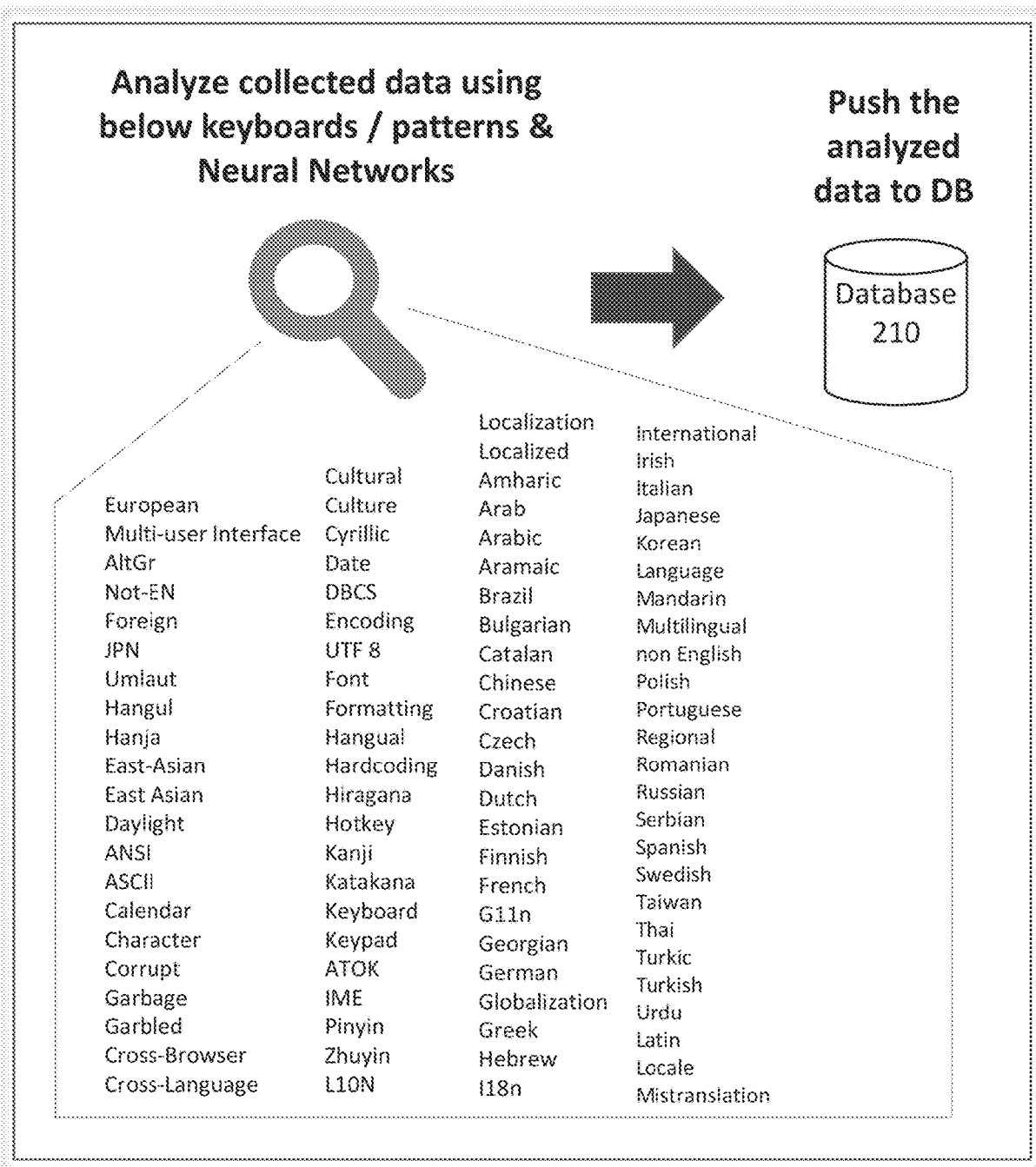
FIG. 4B is a diagram illustrating mining feedback to identify issues in products, in accordance with an illustrative embodiment.
Figure 4C:
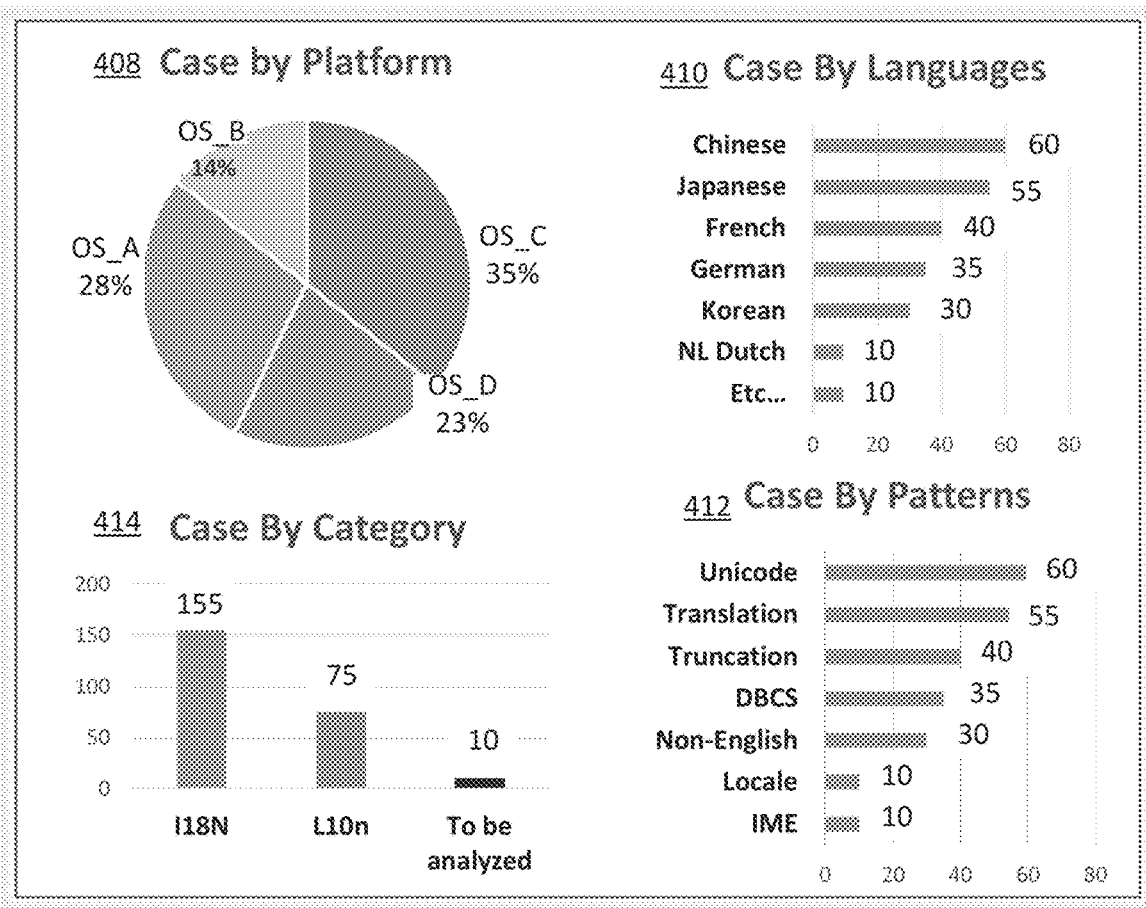
FIG. 4C is an example electronic dashboard that enumerates issues in products, in accordance with an illustrative embodiment.
Figure 4C:
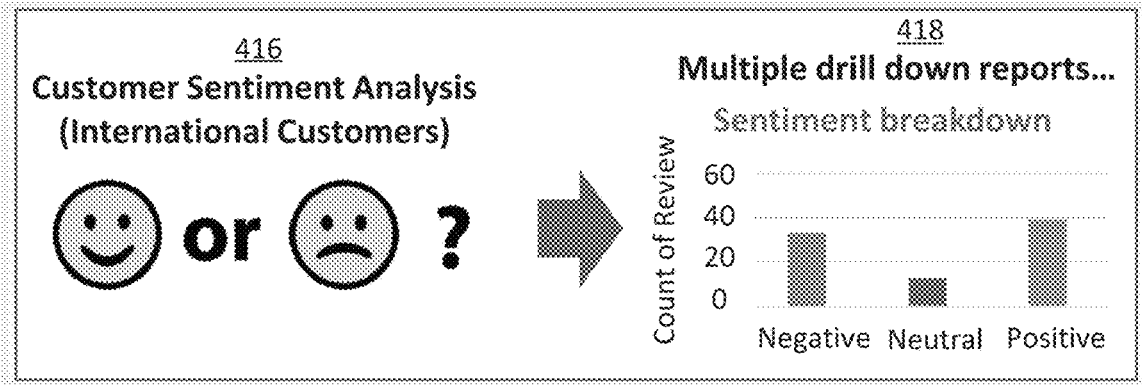

FIG. 4B is a diagram illustrating mining feedback to identify issues in products, in accordance with an illustrative embodiment. The illustration of mining feedback 404 depicted in FIG. 4B can correspond to the block 404 depicted in FIG. 4A. The data processing system can mine the feedback in the database 210 using keyboards, keywords, patterns or neural networks. An illustrative example of keywords, keyboards, or patterns used to analyze or mine the data using a neural network can include: European, Multi-user Interface, AltGr, Not-EN, Foreign, JPN, Umlaut, Hangul, Hanja, East-Asian, East Asian, Daylight, ANSI, ASCII, Calendar, Character, Corrupt, Garbage, Garbled, Cross-Browser, Cross-Language, Cultural, Culture, Cyrillic, Date, DBCS, Encoding, UTF 8, Font, Formatting, Hangual, Hardcoding, Hiragana, Hotkey, Kanji, Katakana, Keyboard, Keypad, ATOK, IME, Pinyin, Zhuyin, L10N, Localization, Localized, Amharic, Arab, Arabic, Aramaic, Brazil, Bulgarian, Catalan, Chinese, Croatian, Czech, Danish, Dutch, Estonian, Finnish, French, G11n, Georgian, German, Globalization, Greek, Hebrew, I18n, International, Irish, Italian, Japanese, Korean, Language, Mandarin, Multilingual, non-English, Polish, Portuguese, Regional, Romanian, Russian, Serbian, Spanish, Swedish, Taiwan, Thai, Turkic, Turkish, Urdu, Latin, Locale, or Mistranslation. The data processing system can then push the analyzed data (e.g., the mined feedback) to the database 210. The data processing system can then query the database 210 in order to enumerate the feedback into an electronic dashboard.

FIG. 4C is an example electronic dashboard that enumerates issues in products, in accordance with an illustrative embodiment. The illustration of an electronic dashboard 420 depicted in FIG. 4C can correspond to the block 420 depicted in FIG. 4A. The data processing system can generate the electronic dashboard 420 using a template. The data processing system can generate the electronic dashboard with one or more categories that can enumerate the cases or issues associated with the software product. For example, the categories can include: cases by platform 408, cases by languages 410, cases by patterns 412, cases by category 414, or cases by sentiment 418.

The data processing system can enumerate the cases by platform 408 in the electronic dashboard 420 depicted in FIG. 4C. The cases by platform 408 can include sub-categories, such as the different types of platforms or operating systems (e.g., OS_A, OS_B, OS_C, or OS_D) in which the software product is being executed, or with which the software product is being accessed. The data processing system can use a template to enumerate the cases by platform 408. The template can include a graphical output or layout. For example, the template can define a graph type (e.g., such as a histogram, pie chart or graph, bar graph, line graph, scatter plot, etc.) to use for enumerating the feedback. As illustrated in the electronic dashboard depicted in FIG. 4C, the cases by platform 408 can be enumerated using a pie chart, where each slice of the pie chart is a different sub-category, or operating system type. The pie chart can further indicate, or enumerate, a percentage of cases attributable to the type of operating system as follows: OS_A—28%; OS_B—14%; OS_C—35%; OS_D—23%. In some embodiments, the data processing system can enumerate the cases by platform 408 using other indicators, such as an absolute number of cases, text or keywords (e.g., high, medium, low), ratio or fractions.

The data processing system can enumerate the cases by languages 410 in the electronic dashboard 420 depicted in FIG. 4C. The data processing system can use a template to enumerate the cases by languages. The data processing system can select a graph type, such as a histogram, pie chart or graph, bar graph, line graph, scatter plot, etc. The data processing system can use a policy to select the type of graph. In this example, the data processing system can enumerate the cases by language using a bar chart with a different rectangle representing each language. The data processing system can further provide an indication that enumerates the number of cases per language. For example, the bar chart can include the following rectangles with the following indications: Chinese—60; Japanese—55; French—40; German—35; Korean—30; NL Dutch—10; Etc.—10. The length of the rectangle can correspond to the number of cases for that language.

The data processing system can enumerate the cases by patterns 412 in the electronic dashboard 420 depicted in FIG. 4C. The data processing system can use a template to enumerate the cases by patterns 412. For example, the bar chart can include the following rectangles with the following indications: Unicode—60; Translation—55; Truncation—40; DBCS—35; Non-English—30; Locale—10; IME—10. The length of the rectangle can correspond to the number of cases for that pattern.

The data processing system can enumerate the cases by sentiment 418 in the electronic dashboard 420 depicted in FIG. 4C. The data processing system can use a template to enumerate the cases by sentiment 418. Sentiment can include negative, neutral or positive. For example, the bar chart can include the following rectangles with the following indications: negative—35; neutral—15; positive—40. The length of the rectangle can correspond to the number of cases for that pattern. The bar graph can be displayed as horizontal or vertical.

The data processing system can include generate the electronic dashboard to be interactive. For example, the interactive component can include a multiple drill down reports for a category, such as the sentiment breakdown 418. Selecting a rectangle corresponding to a sentiment can result in modifying one or more enumerations of other categories. For example, selecting the "negative" sentiment can cause the data processing system to generate the electronic dashboard with enumeration of categories 408, 410, 414 and 412 for cases with negative sentiment. Selecting the "neutral" sentiment can cause the data processing system to generate the electronic dashboard with enumeration of categories 408, 410, 414 and 412 for cases with neutral sentiment. Selecting the "positive" sentiment can cause the data processing system to generate the electronic dashboard with enumeration of categories 408, 410, 414 and 412 for cases with positive sentiment. Responsive to a selection of a sentiment, the data processing system can query a database 210 to obtain the mined feedback (e.g., mined using keywords, patterns or neural network).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, or a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of identifying issues in products, comprising:
obtaining, by a data processing system, data from a plurality of heterogeneous sources, the data providing feedback, in different languages, indicative of issues with one or more processor-executable software products raised by a plurality of different users;
storing, by the data processing system, the feedback in a repository;
identifying, by the data processing system, a plurality of keywords and a plurality of patterns to use for mining the feedback stored in the repository;
mining, by the data processing system based on the plurality of keywords and the plurality of patterns, the feedback in the different languages stored in the repository using a neural network model trained with historical feedback to have weights configured to identify negative, positive, or neutral feedback in the respective different languages;
enumerating, by the data processing system responsive to the mining, the feedback by counting a number of issues raised by the plurality of different users in each of a plurality of categories, wherein one or more categories of the plurality of categories identify the number of issues in a processor-executable software product by the different languages that are addressable by installing one or more software updates for the processor-executable software product;
generating, by the data processing system, graphical output comprising an interactive electronic dashboard, the interactive electronic dashboard comprising enumeration of the feedback in the one or more categories of the plurality of categories that identify issues with the processor-executable software product arising in one or more of the different languages that are addressable by installing the one or more software updates for the processor-executable software product, and the interactive electronic dashboard configured to toggle the enumeration of the feedback in the one or more categories between negative, positive or neutral feedback responsive to a selection from a user;
transmitting, by the data processing system via a network, the graphical output to a client device, receipt of the graphical output causing the client device to render the graphical output for display via a display device; and
subsequent to transmitting the graphical output to the client device, providing at least one software update to the processor-executable software product to cause installation of the at least one software update to address one or more of the identified issues with the processor-executable software product arising in one or more of the different languages that make the processor-executable software product prone to erring in one or more of the different languages.

2. The method of claim 1, comprising:
obtaining the data via at least one of a customer escalation database, electronic mail, an online social network platform, or an online application delivery marketplace.

3. The method of claim 1, wherein at least a portion of the data is generated from voice input provided by a plurality of customers, the method comprising:
determining, from the data, the different languages of the voice input; and
establishing, responsive to determining the different languages of the voice input, the one or more categories of the plurality of categories that identify issues by the different languages.

4. The method of claim 1, wherein the one or more categories correspond to at least one of a type of issue or a severity of the type of issue.

5. The method of claim 1, wherein the plurality of patterns comprise at least one of Unicode, translation, truncation, double-byte character set, non-English, locale, or input method editor.

6. The method of claim 1, comprising:
generating the interactive electronic dashboard with an indication of one or more areas that are error prone, the one or more areas comprising at least one of keyboard, Unicode, or right-to-left.

7. The method of claim 1, comprising:
enumerating, using semantic analysis, the feedback into a negative sentiment category, a neutral sentiment category, and a positive sentiment category; and
generating the graphical output with the interactive electronic dashboard including the enumeration of the feedback into the negative sentiment category, the neutral sentiment category, and the positive sentiment category.

8. The method of claim 7, comprising:
receiving, by the data processing system, a selection of the negative sentiment category; and
generating updated graphical output comprising the interactive electronic dashboard with an indication of one or more languages associated with the negative sentiment category.

9. The method of claim 7, comprising:
receiving, by the data processing system, a selection of the negative sentiment category; and
generating updated graphical output comprising the interactive electronic dashboard with an indication of one or more patterns associated with the negative sentiment category.

10. A system for identifying issues in products, comprising:
a data processing system comprising memory and one or more processors to:
obtain data from a plurality of heterogeneous sources, the data providing feedback, in different languages, indicative of issues with one or more processor-executable software products raised by a plurality of different users;
store the feedback in a repository;
identify a plurality of keywords and a plurality of patterns to use for mining the feedback stored in the repository;
mine, based on the plurality of keywords and the plurality of patterns, the feedback in the different languages stored in the repository using a neural network model trained with historical feedback to have weights configured to identify negative, positive, or neutral feedback in the respective different languages;
enumerate, responsive to the mining, the feedback by counting a number of issues raised by the plurality of different users in each of a plurality of categories, wherein one or more categories of the plurality of categories identify the number of issues in a processor-executable software product by the different languages that are addressable by installing one or more software updates for the processor-executable software product;
generate graphical output comprising an interactive electronic dashboard, the interactive electronic dashboard comprising enumeration of the feedback in the one or more categories of the plurality of categories that identify issues with the processor-executable software product arising in one or more of the different languages that are addressable by installing the one or more software updates for the processor-executable software product, and the interactive electronic dashboard configured to toggle the enumeration of the feedback in the one or more categories between negative, positive or neutral feedback responsive to a selection from a user;
transmit, via a network, the graphical output to a client device, receipt of the graphical output causing the client device to render the graphical output for display via a display device; and
subsequent to transmission of the graphical output to the client device, provide at least one software update to the processor-executable software product to cause installation of the at least one software update to address one or more of the identified issues with the processor-executable software product arising in one or more of the different languages that make the processor-executable software product prone to erring in the one or more of the different languages.

11. The system of claim 10, wherein the data processing system is further configured to:
obtain the data via at least one of a customer escalation database, electronic mail, an online social network platform, or an online application delivery marketplace.

12. The system of claim 10, wherein at least a portion of the data is generated from voice input provided by a plurality of customers, and the data processing system is further configured to:
determine, from the data, the different languages of the voice input; and
establish, responsive to the determination of the different languages of the voice input, the one or more categories of the plurality of categories that identify issues by the different languages.

13. The system of claim 10, wherein the one or more categories correspond to at least one of a type of issue or a severity of the type of issue.

14. The system of claim 10, wherein the plurality of patterns comprise at least one of Unicode, translation, truncation, double-byte character set, non-English, locale, or input method editor.

15. The system of claim 10, wherein the data processing system is further configured to:
generate the interactive electronic dashboard with an indication of one or more areas that are error prone, the one or more areas comprising at least one of keyboard, Unicode, or right-to-left.

16. The system of claim 10, wherein the data processing system is further configured to:
enumerate, using semantic analysis, the feedback into a negative sentiment category, a neutral sentiment category, and a positive sentiment category; and
generate the graphical output with the interactive electronic dashboard including the enumeration of the feedback into the negative sentiment category, the neutral sentiment category, and the positive sentiment category.

17. The system of claim 16, wherein the data processing system is further configured to:
receive a selection of the negative sentiment category; and
generate updated graphical output comprising the interactive electronic dashboard with an indication of one or more languages associated with the negative sentiment category.

18. The system of claim 16, wherein the data processing system is further configured to:
receive a selection of the negative sentiment category; and
generate updated graphical output comprising the interactive electronic dashboard with an indication of one or more patterns associated with the negative sentiment category.

* * * * *